April 4, 1967  J. W. MONROE ETAL  3,312,231
APPARATUS FOR THE RECLAMATION OF SOLID
PROPELLANT ROCKET MOTOR CASES
Filed Oct. 29, 1962  4 Sheets-Sheet 1

JOSEPH W. MONROE
JAMES L. MURPHY JR.  INVENTORS
MARY H. LARIMER
ROBERT H. BROWN
MARVIN R. POTTS

BY *Robt. D. Williams Jr.* ATTORNEY

JOSEPH W. MONROE
JAMES L. MURPHY JR. INVENTORS
MARY H. LARIMER
ROBERT H. BROWN
MARVIN R. POTTS

BY *Robt. S. Williams Jr.* ATTORNEY

April 4, 1967

J. W. MONROE ET AL 3,312,231

APPARATUS FOR THE RECLAMATION OF SOLID
PROPELLANT ROCKET MOTOR CASES

Filed Oct. 29, 1962

JOSEPH W. MONROE
JAMES L. MURPHY JR. INVENTORS
MARY H. LARIMER
ROBERT H. BROWN
MARVIN R. POTTS

BY *Robt H Williams Jr* ATTORNEY

3,312,231
APPARATUS FOR THE RECLAMATION OF SOLID PROPELLANT ROCKET MOTOR CASES

Joseph W. Monroe, James L. Murphy, Jr., Mary H. Larimer, Robert H. Brown, and Marvin R. Potts, Huntsville, Ala., assignors to Thiokol Chemical Corporation, Bristol, Pa., a corporation of Delaware
Filed Oct. 29, 1962, Ser. No. 233,516
6 Claims. (Cl. 134—111)

This invention relates to the reclamation of solid propellant rocket motor cases and more particularly to a hydraulic apparatus using a moderately high pressure, high volumetric water content for such reclamation.

Reclamation of rocket motor cases containing improperly cured, fractured, or otherwise damaged solid propellant grains has become increasingly important. Formerly, rocket motor cases were relatively small and made of inexpensive materials. Thus, damaged rocket motors could be discarded, since the motor cases, the only salvagable item, represented a relatively small investment per rocket motor. Due, however, to the great advance that has been made in solid propellant rockets, motor cases for such rockets have become substantially larger and are being made of expensive materials at considerably higher cost for machinery, heat treating, etc. Since such motor cases represent a significantly large portion of the cost of a large solid propellant rocket motor, salvage without damage to the motor case has become economically significant.

The major problem in reclaiming the motor cases from rejected solid propellant rocket motors is the removal of the propellant grain. A number of methods and variations have been used or studied. One of these is the burning out of the propellant grain either in the atmosphere or under water. The nozzle is left off the motor case so that a high pressure will not be developed in the motor case and the grain is ignited. This method has worked with some degree of success with relatively small, heavy-walled motor cases, but larger, light-walled motor cases, particularly those which must be heat-treated, are extremely susceptible to damage by this method.

Solid propellant grains have also been removed by entirely mechanical means such as augers or boring bars. In essence, this is an extension of a normal finishing process in which the grain is trimmed to specified limits. As in the finishing process, extreme precautions are necessary to prevent possible damage to the motor case. Further, since sufficient frictional heat to ignite the propellant grain may be generated, the entire operation must be carried out under remote control, complicating the problem of accurate control of the cutting apparatus. To somewhat reduce the fire hazards of this operation, water has been used as a coolant as well as a medium to flush the propellant cuttings from the motor case.

In a variation of the previous method, the water has been used to leach a water-soluble oxidizer from the solid propellant grain. As the oxidizer is removed, a spongy network of polymeric binder is left behind. This soft spongy network is readily broken up by mechanical means without the hazards associated with the mechanical break-up of live propellant grain. The leaching process, however, is very slow and the motor case must therefore be "soaked" for a long period of time, during which period the motor case is exposed to the corrosive action of the water and oxidizer solution. Solvents for the polymeric binder have been employed, but as with the water "soak-out" the process involves extended time periods, and does not have the advantage of reduced fire hazards, etc.

Inasmuch as high pressure, high velocity water jets had been successfully used in cutting hard materials, such as metals, their use in propellant grain removal was investigated. While such methods were successful on metals and could be used with a degree of success on very hard double-base propellant grains, they were far from successful on the usual composite propellant grains. Composite propellant grains are quite resilient, and a large proportion of the force of the high velocity water jet is absorbed in the deformation of the propellant grain. The cutting action of the water jet is therefore extremely limited, in both depth and cross-section. By closely spacing a number of very high pressure jets in intersecting relation in close proximity to the surface of the propellant grain, narrow, shallow strips of the propellant grain can be removed. The effect produced is similar to the removal of the propellant grain with a V-gouge, but without the danger of creating frictional heat which might ignite the propellant grain. As safe as this method may be from this aspect, it is quite slow. Further, since such high pressure jets are effective metal cutters, there is the danger of damaging the motor case and its associated hardware if an attempt is made to remove the last few fractions of an inch of the propellant grain or the liner from the motor case.

The use of an abrasive with the high velocity water jets has also been suggested, but this method was not found to be practicable because of damage to the hardware employed with the motor case. As previously indicated, however, the material to be removed had to be considered and is an important factor in the use of a high velocity water jet with or without an abrasive.

The present method has been developed whereby a composite solid propellant grain may be quickly and economically removed without damage to the motor case. By using a plurality of relatively large (3/16") nozzles with a relatively high volume of water (60 to 80 gallons per minute per nozzle), at moderately high pressure (4000 to 6000 pounds per square inch) (p.s.i.) a very effective reclamation of the motor case was achieved. When such conditions exist, the effect on the propellant grain appears to be one of tearing rather than cutting or piercing as with the needle-like stream of water discharged by the high velocity water jets, thus relatively wide and deep channels will be torn through the propellant grain, and the propellant grains between the channels will be disintegrated in chunks of considerable size when the nozzles are positioned so that their ejected streams of water will intersect at a depth of several inches within the propellant grain.

Therefore, since the critical range for successful operation of this method is well below the critical range for metal cutting or piercing, there is no danger that the motor case will be damaged by the impact of the ejected streams of water. The motor case can, therefore, be completely cleaned of all of the propellant grain, liner and other materials of comparable physical properties without deleteriously affecting the motor case and the associated hardware thereof.

It has also been determined that the use of mechanical boring in removing the propellant grain may limit the size of the motor case being reclaimed because of the cost of the equipment that would be required to carry out this method. However, the use of the present method by means of this embodiment of the present invention is limited only by the availability of an adequate and suitable water supply.

In water and sewerage systems it is common practice to clean conduits and similar items with water under pressure, but in such instances the type of apparatus employed is a far cry from the type of apparatus used in the present embodiment of the invention that is susceptible of cleaning and reclaiming motor cases.

Once the water pressure and the volumetric content of the water was determined, every precaution had to be taken to maintain such pressure and volumetric content constant. Excessive pressure, pressure surges and variation of volumetric content of the water had to be avoided if the reclamation of the motor case was to be successful.

To reach a final determination, therefore, a method and apparatus that was both safe and economical had to be provided.

Accordingly, therefore, it is an object of this invention to provide apparatus for the reclamation of motor cases that is both safe and economical.

Another object of this invention is to provide an apparatus that is adapted to be mounted in alignment with the head end of a motor case and provided with a plurality of water outlets that may be directed at various angles to the surface of the solid propellant grain so that water exiting through the outlets will be directed against the surface of the solid propellant grain for the disintegration thereof.

A further object of the invention is to provide an apparatus that will direct moderately high pressure, high volumetric streams of water against the solid propellant for the disintegration thereof.

With the above and other objects and advantages in view, the invention consists of the novel details of construction, arrangement and combination of parts more fully hereinafter described, claimed and illustrated in the accompanying drawings in which:

FIGURES 4–7 inclusive are views illustrating the various arrangements of nozzles that may be employed to remove solid propellant from a motor case.

Figure 1:
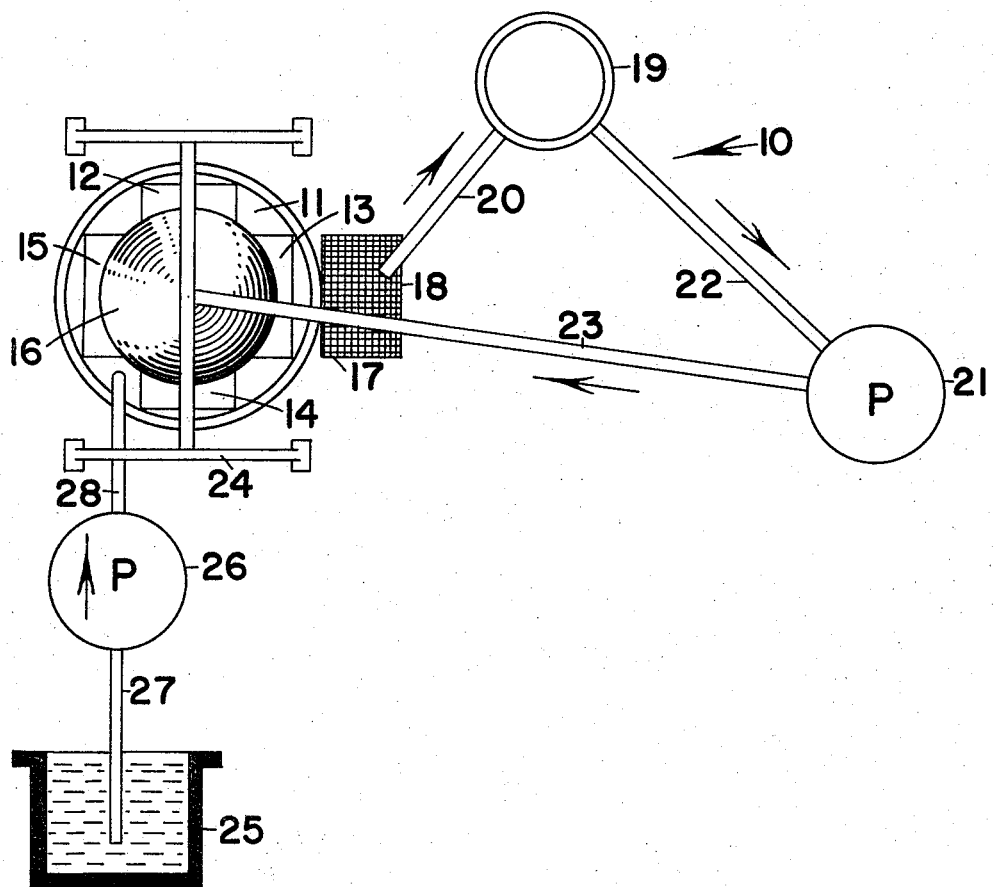
FIGURE 1 is a schematic view of the arrangement of parts that are required to carry out an embodiment of the invention.
Figure 2:
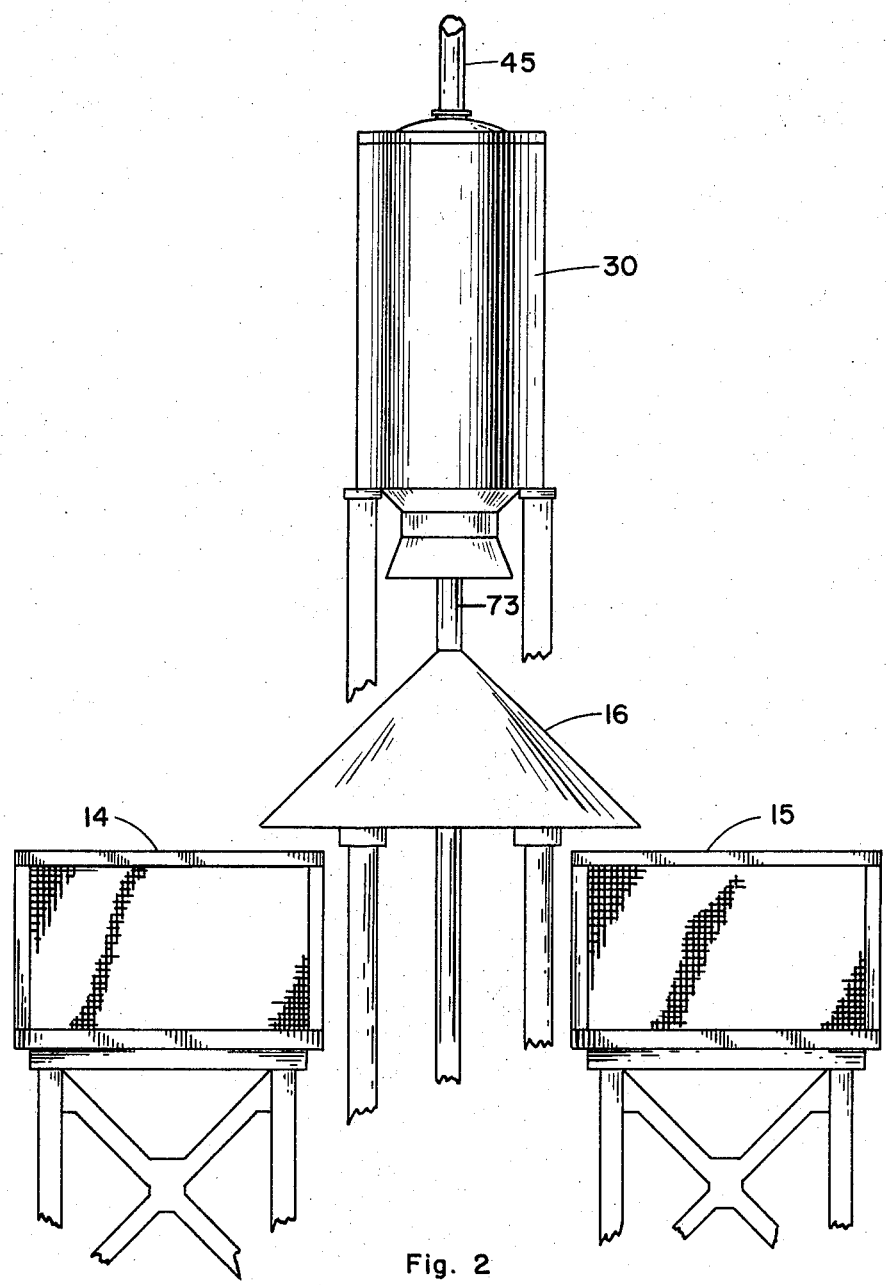
FIGURE 2 is a further schematic view of the arrangement of parts that are required to carry out an embodiment of the invention.

Referring more in detail to the darwings and more especially to FIGURE 1 wherein like parts are designated by like reference numerals, the reference numeral 10 is used to generally designate a hydraulic system to be used in the reclamation of motor cases.

To carry out the method used to reclaim a motor case by means of the system 10 shown in FIGURE 1, it is necessary to provide a facility for retaining motor cases in a substantially vertical position during the reclamation period. One way this may be done is to provide a pit 11 into which a motor case may be lowered. The size of the pit 11 as to depth and diameter will depend on the size of the motor case to be reclaimed. Thus the pit 11 would normally be of sufficient size to handle a large motor case since motor cases of less size may be reclaimed in a large pit as readily as in a smaller pit.

It is also possible to build a supporting structure or scaffold that rests on a prepared concrete surface, which can be of sufficient strength to resist the thrust of an ignited rocket motor that may be encountered during the reclamation of the motor case. However, for purposes of simplicity, the pit 11 would be the most economical and the easiest to provide.

A plurality of filter baskets 12, 13, 14 and 15 are positioned above the bottom of the pit 11 to separate debris from the water. The number, size and configuration of the filter baskets are not critical except that it is absolutely necessary that substantially all debris should be separated from the water.

Positioned in the pit 11 above but adjacent to the filter baskets 12, 13, 14 and 15 is a deflector 16 which deflects any material that comes out of the motor case into the filter baskets during the reclamation of a motor case so that the filter baskets filter the water used in the reclamation of the motor case.

Overflow of water from the pit 11 flows through a filter screen (not shown) into a sump 17 where it is picked up by a pump (not shown) and is discharged into a surge tank 19 through a conduit 20. A grating 18 covers the sump 17 to prevent debris or operators of the system from falling into the sump 17.

A pressure pump 21 draws water from the surge tank 19 by means of a suction conduit 22 and supplies water under pressure to the pit 11 by means of a supply conduit 23. The outlet end of the supply conduit 23 is supported above the pit 11 by means of a support 24 which is positioned so that it bridges the open upper end of the pit 11 as shown in FIGURE 1.

The arrangement of the conduit 20, surge tank 19, pump 21 and conduit 23, provides a continuous recirculation of water from the pit 11, through the pump for the surge tank 19, pressure pump 21 and their associated conduits back into the pit 11. Any water that is lost during the operation of the system 10 is replaced by a controlled supply from a reservoir 25, pump 26 and conduits 27 and 28 all as shown in FIGURE 1.

Positioned in circumjacent relation to the upper open end of the pit 11 is an annular support 29, and the support is adapted to engage the head end of a motor case 30. Mounted on the support 29 in vertical alignment with the motor case 30 is a reclamation apparatus 31 which utilizes the water directed to the pit 11 by the conduit 23 to reclaim a motor case such as shown at 30 in FIGURE 3.

The reclamation apparatus 31 comprises a bottom ring 32, a plurality of vertically disposed, equally spaced supporting rods 33 which are fixed at their lower ends to the bottom ring 32 and a power unit 34 that is fixed to the upper ends of the supporting rods 33.

The power unit 34 consists of a circular plate 35 that is fixed at its peripheral edge to the rods 33, an upper bearing plate 36 that is held in fixed spaced relation to the main bearing plate 35 by a plurality of supporting rods 37 that are fixed to and extend between the upper bearing plate 36 and the main bearing plate 35. A reversible electric motor 38, carried by the main bearing plate 35, has electric current supplied thereto by an electric cable 39, that is connected to any well-known electrical source (not shown).

The motor 38 has a drive shaft 40 which is coupled at 41 to a driven shaft 42 of a gear assembly 43 that is mounted on the upper bearing plate 36. A vertically disposed tubular driven member 44 extends through the gear assembly 43 and has operational engagement therewith so that the member 44 is rotated through the medium of the gear assembly 43 and motor 38. An extension 45 of the supply conduit 23 extends through the member 44 and is coupled to the member 44 by clamps 46 and 47. The clamps 46 and 47 are at the opposite ends of the member 44 and thus when the member 44 is rotated, the extension 45 of the supply conduit 23 will also be rotated. A bearing assembly 48 for the member 44 is provided in the gear assembly 43 and a second bearing assembly 49 for the member 44 is provided in the plate 35.

A variable speed reversible electric motor 50 is mounted on the upper surface of the upper bearing plate 36 and the drive shaft thereof is coupled to a gear assembly 51 also mounted on the upper bearing plate 36 adjacent to the motor 50. The output shaft of the gear assembly 51 comprises a traversing screw 52 which depends therefrom in vertical relation thereto. A bearing assembly 53 is provided in the main bearing plate 35 for rotatably mounting the screw 52, a bearing assembly 54 is also provided in the upper bearing plate 36 for the screw 52, and a gear 55 is secured to the screw 52 intermediate of the bearing assembly 53 and the bearing assembly 54.

Figure 3:
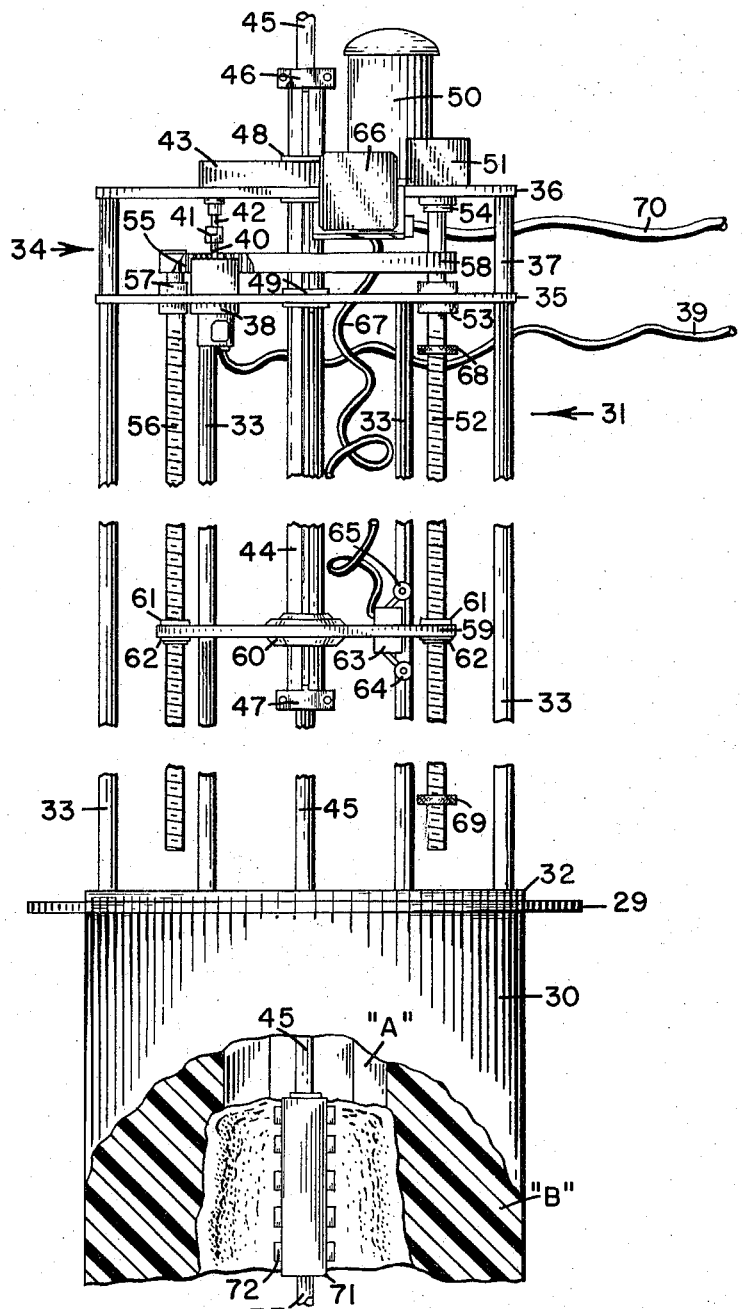
FIGURE 3 is an elevational view partly in section of the manner of mounting the apparatus embodying the invention in close proximity to a motor case.

A further traversing screw 56 extends through the main bearing plate 35 invertical spaced alignment with the screw 52 and is retained in the main bearing plate 35 by a bearing assembly 57. The screw 56 is also provided with a gear 55 and a flexible gear belt 58 has operational engagement with the gears 55 as shown in FIGURE 3.

A follower plate 59 is mounted on the member 44 and is connected thereto by a combination bearing assembly and coupling 60 and nuts 61 mounted in the plate 59 by bearing assemblies 62 have operational engagement with the traversing screws 52 and 56 so that by rotation of the traversing screws 52 and 56 in opposite directions the member 44 is caused to move vertically upwardly and downwardly. A control switch 63 is mounted on the follower plate 59 and is provided with sweep roller contact arms 64 and 65 for the operation thereof. The control switch 63 is connected to a motor control 66 by means of an electric cable 67 and the control 66 has operational connection with the reversible electric motor 50 for the operation thereof. Adjustable stop members 68 and 69 are mounted on the screw 52 in the path of and for engagement with the contact arms 64 and 65 of the switch 63 so that upon contact of the arms 64 and 65 with the stop members 68 and 69 the vertical upward and downward movement of the follower plate 59 is controlled and limited. The operation of the motor control 66 is accomplished by its connection to a suitable source of electric current by means of an electric cable 70.

The extension 45 of the supply conduit 23 extends downwardly through the member 44 into the motor case 30 and has a manifold 71 connected to the lower end thereof. As previously stated, the extension 45 is coupled to the member 44 by the clamps 46 and 47 so that when the member 44 is rotated or caused to reciprocate vertically the member 44 and extension 45 will rotate and reciprocate simultaneously. The manifold 71 is provided with a plurality of diametrically arranged threaded outlet ports 72 to which nozzles may be attached as will be later described. A guide or stabilizing rod 73 is connected to the lower end of the manifold 71 for the stabilization thereof.

Figure 4:
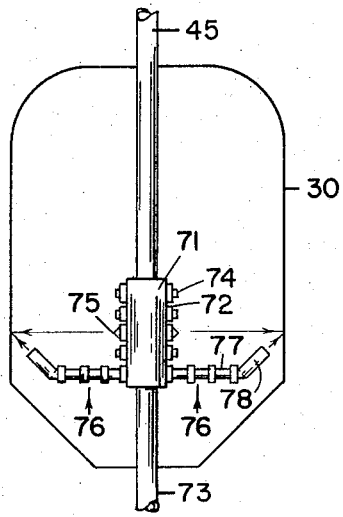

In FIGURES 4 to 7 inclusive several arrangements of nozzles are shown in various positions to remove the solid propellant and reclaim the motor case 30, and the arrangements as shown are merely illustrative and not to be considered as limiting to the exact arrangements as shown, since the same may vary as the method of reclamation is carried out. Referring more particularly to FIGURE 4, plugs 74 are removably connected to certain of the outlet ports 72. One pair of oppositely disposed outlet ports 72 has nozzles 75 removably connected thereto, and the remaining pair of outlet ports 72 has nozzles 76 removably connected thereto. Each of the nozzles 76 has a horizontally disposed straight portion 77 and an upwardly directed angular portion 78. Thus, when water is supplied to the manifold 71 by means of the extension 45 of the supply conduit 23, water will be discharged from the nozzles 75, and the nozzles 76 to simultaneously impinge at a common area against any solid propellant that is in the motor case 30.

Figure 5:
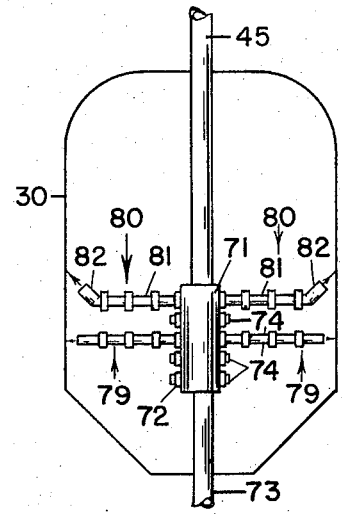

In FIGURE 5 certain of the outlet ports 72 have the removable plugs 74 positioned therein, a pair of the outlet ports 72 have nozzles 79 connected thereto, and another pair of the outlet ports 72 have nozzles 80 connected thereto. The nozzles 80 are of similar configuration to the nozzles 76 except that the horizontally disposed straight portions 81 thereof are longer than the portions 77 of the nozzles 76 and the angularly disposed portions 82 are shorter than the portions 78 of the nozzles 76. The nozzles 76, 79 and 80 are horizontally disposed, and each of the nozzles are composed of short sections which are joined to each other by couplings. Thus the overall length of the nozzles may be varied as to the number of short sections that are used to complete the nozzles.

Figure 6:
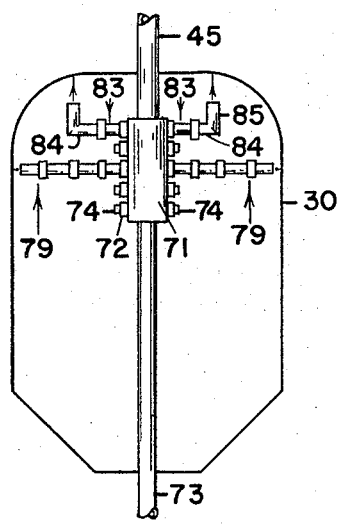

In FIGURE 6 certain of the outlet ports 72 have the removable plugs 74 positioned therein, a pair of the outlet ports 72 have the nozzles 79 removably connected thereto, and the remaining pair of outlet ports 72 have the nozzles 83 removably connected thereto. Each of the nozzles 83 have straight horizontally disposed portions 84 and vertically disposed portions 85 that are disposed at right angles to the portions 84.

Figure 7:
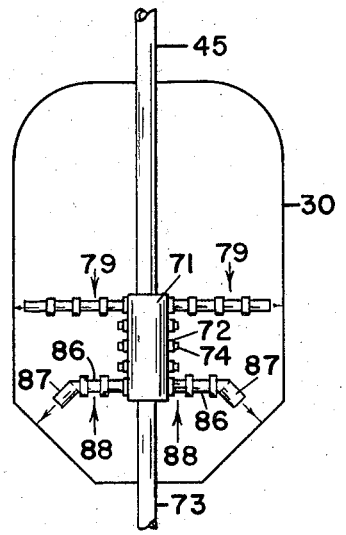

In FIGURE 7 certain of the outlet ports 72 have the removable plugs 74 positioned therein, a pair of the outlet ports 72 have the nozzles 79 removably connected thereto, and the remaining pair of outlet ports 72 have the nozzles 88 connected thereto. The nozzles 88 are of similar configuration to the nozzles 76 having straight horizontally disposed portions 86, but the latter portions are of shorter length than the portions 77 of the nozzles 76. However, the angularly disposed potrions 87 of the nozzles 88 are of the same length as the angularly disposed portions 78 of the nozzles 76.

The nozzles 83 and 88 are also composed of short sections coupled together and the portions 78, 82 and 85 and 87 are also coupled to the portions 77, 81, 84 and 86 as are the short sections of the horizontally disposed portions coupled together as previously set forth.

In the reclamation of a solid propellant rocket motor the motor case 30 is lowered into the pit 11, and the reclamation apparatus 31 is then placed in position on the support 29 and aligned with the motor case 30. Detachable fastening means, not shown, are then used to couple the motor case 30 and reclamation apparatus 31 to the support 29. The support 24 is then placed in position, and the extension 45 is coupled to the supply conduit 23 with a "Chiksan" swivel connection and a flexible conduit, not shown. The swivel connection and flexible conduit permit the extension 45 to be raised and lowered as well as rotated. The conduits 20, 22 and 23 may either be flexible or rigid to provide an assembly as shown in FIGURE 1. With the apparatus assembled as described, water from reservoir 25 is pumped into the pit 11 through the medium of the pump 26. When a sufficient amount of water is available in the pit 11 the pump 26 is shut off and the pump 21 is then started to cycle and re-cycle the water through the surge tank 19, the extension 45, manifold 71, and the nozzles as shown, into the pit and then to the surge tank 19.

The manifold 71 is lowered into the conventional cavity A that exists in all solid propellant charges such as shown at B in FIGURE 3, and water entering the manifold 71 is discharged against the walls of the cavity A as shown in FIGURES 4 to 7 inclusive.

The choice and arrangement of the nozzles depends on the area of the motor case 30 desired to be reclaimed. FIGURES 4 and 5 are used to reclaim the cylindrical area of the motor case 30. FIGURE 6 shows the reclamation of the head end of the motor case 30 and FIGURE 7 shows the reclamation of the aft end of the motor case 30. From the start of the reclamation of the motor case 30 to the finish thereof, the length of the nozzle assembly depends entirely on the amount of the propellant that has been removed, because it is the proximity of the discharge end of the nozzles to the propellant that determines the efficiency of the reclamation of the motor case 30.

The rate of reclamation of the motor case 30 depends, therefore, on many variables, such as the pressure and volumetric content of the water, the size and shape of the nozzles, the number of nozzles used, the distance from the discharge end of the nozzle to the solid propellant, temperature of the water, type of solid propellant, the rotation of the manifold 71 by the motor 38 and the speed of traverse of the nozzles by the motor 50 as the nozzles are rotated and traversed along the longitudinal axis of the rocket motor case 30.

If the pressure of the water is maintained in the vicinity of 4500 p.s.i. and the volumetric content of the water is maintained at 280 g.p.m., a successful reclamation of the motor case 30 will be achieved. If the pressure is increased or if the volumetric content is raised, good results will not be obtained. Both are maintained static after the aforementioned conditions have been obtained.

A vast savings may be achieved by employing the method of motor case reclamation previously described without damaging the rocket motor case. Fire hazards are virtually eliminated, and the reclamation of the motor case 30 can be achieved so that it will not be necessary to purchase new motor cases if it is only the solid propellant charge that has been damaged.

It is believed, therefore, that the foregoing description clearly outlines the method of reclamation used, and the proper assembly of the various components to carry out the method, so that both will be clear to one skilled in the art and it is to be understood that minor changes in the arrangement and combination of the various components to achieve the apparatus may be adhered to provided the same falls within the spirt of the invention and the scope of the appended claims.

Having thus described the invention what is claimed as new and desired to be secured by Letters Patent is:

1. An apparatus for disintegrating and removing from a rocket motor case a solid propellant grain that has been cast therein, comprising a bottom ring that is adapted to be positioned on the open end of the motor case in axial alignment therewith, a plurality of equally-spaced, vertically-disposed support rods secured at their lower ends to said bottom ring, a power unit, said power unit comprising a lower circular plate secured to the upper ends of said support rods, a plurality of equally-spaced, vertically-disposed support rods secured at their lower ends to said lower circular plate and an upper circular bearing plate secured to the upper ends of said last said support rods, a power source mounted on said lower circular plate, a gear assembly mounted on said upper circular bearing plate and having a drive connection with said power source, a vertically disposed tubular member extended through said gear assembly and having a drive connection therewith, a fluid supply conduit mounted within said tubular member and rigidly connected thereto, a second power source mounted on the upper surface of said upper circular bearing plate, a second gear assembly mounted on said upper circular bearing plate and having a drive connection with said second power source, a first vertically-disposed, traversing screw connected to said second power source, a first output source secured to said first traversing screw, a second vertically-disposed traversing screw mounted for rotation in said lower circular plate, a second output source secured to said second vertically-disposed, traversing screw, a flexible drive connection between said first and second output sources, a follower plate secured to said vertically disposed tubular member, said follower plate having operational connection within said first and second traversing screws whereby said follower plate and said tubular member are reciprocated within said motor case, a manifold connected to the lower end of said fluid supply conduit and a plurality of fluid ejection nozzles secured to said manifold for directing jets of fluid against the solid propellant grain in said motor case for the disintegration and removal thereof.

2. An apparatus, as in claim 1, wherein a control switch is mounted on said follower plate, adjustable stop members are mounted on said first and second traversing screws and contact arms are provided for said control switch that are adapted to engage said adjustable stop members to control and limit the reciprocal movement of said follower plate.

3. An apparatus, as in claim 1, wherein a stabilizing rod is connected to said manifold and a deflector is secured to said stabilizing rod below said motor case.

4. An apparatus, as in claim 3, wherein a plurality of filter baskets are positioned below said deflector.

5. An apparatus, as in claim 4, wherein said motor case is positioned in a pit and said deflector and said filter baskets are positioned in said pit below said motor case.

6. An apparatus, as in claim 1, wherein a filtered supply of liquid is fed to said fluid supply pipe and means is provided for recirculating said fluid through said fluid supply pipe.

References Cited by the Examiner

UNITED STATES PATENTS

| 1,492,925 | 5/1924 | Knight | 134—22 X |
|---|---|---|---|
| 1,492,956 | 5/1924 | Bots | 134—22 X |
| 2,208,813 | 7/1940 | Ostling | 134—24 |
| 2,245,575 | 6/1941 | Court. | |
| 2,510,056 | 6/1950 | Axtell | 134—24 X |
| 2,858,836 | 11/1958 | Geh et al. | 134—167 |

CHARLES A. WILMUTH, *Primary Examiner.*

MORRIS O. WOLK, *Examiner.*

J. ZATARGA, *Assistant Examiner.*